Patented Jan. 28, 1936

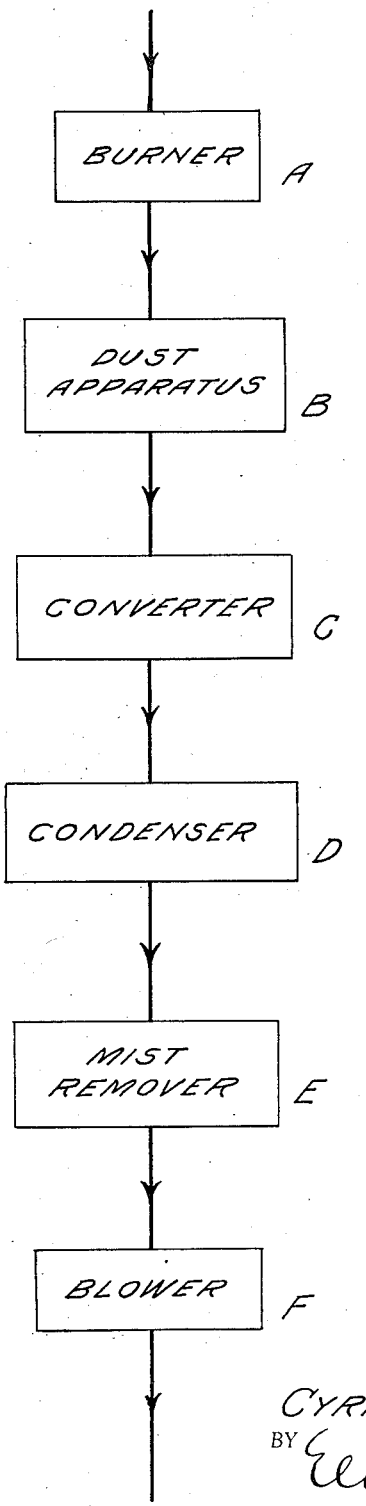

2,028,739

UNITED STATES PATENT OFFICE 2,028,739

SULPHURIC ACID MANUFACTURE

Cyril B. Clark, Scarsdale, N. Y., assignor, by mesne assignments, to American Cyanamid & Chemical Corporation, a corporation of Delaware Application September 21, 1933, Serial No. 690,366

4 Claims. (Cl. 23—175)

My invention relates more particularly to the catalytic oxidation of sulphur dioxide to sulphur trioxide by passing the gas mixture produced from burning the sulphur containing materials over suitable catalytic materials without allowing the temperature of the gases throughout the process to fall materially below that required for an approximate 97–98% conversion to sulphuric anhydrid in the converter.

In known processes for making contact sulphuric acid by the use of platinum contact material as a catalyst, the raw material for the production of the $SO_2$ gas mixture must be brimstone of the Louisiana type having a very minute arsenic content (about .0002% of $As_2O_3$); otherwise the process has been found to be inoperative through poisoning of the platinum catalyst from the arsenic.

According to my invention, I have discovered a novel process for making contact sulphuric acid, or rather for converting an $SO_2$ gas mixture (7 to 8% $SO_2$) into sulphur trioxide, while maintaining the proper temperatures throughout the entire conversion with a gas mixture derived from raw materials such as impure brimstone or Spanish pyrites ore containing at least five times the arsenic content of brimstone of the Louisiana type, along with chlorine, fluorine and other impurities, such as dust and fume that are ordinarily present when sulphide ores containing zinc, lead and arsenic are used as the raw material for the production of the $SO_2$ gas mixture. The other impurities above mentioned and dust may consist of such materials as selenium, silica and iron oxides. That the treatment of such impure raw material to produce therefrom sulphuric acid represents a real problem, will be readily appreciated when it is recognized that Spanish pyrites ore, for instance, contains only about 45% sulphur, the rest being extraneous material including lead, arsenic, chlorine, fluorine, and other impurities as indicated above. A representative analysis of this type of ore is given in "Sulphuric Acid-Raw Material," by Wyle (1923) on page 92.

In my new process I introduce a purification step in removing the major portions of the impurities to avoid coating or poisoning of the catalyst, deterioration of the catalyst carrier, and contamination of the product, and when the burner gas contains a large amount of zinc or lead fume, it is desirable to use a filtering device in the passage of the gas before the latter enters the converter.

I have discovered that by using a catalyst of the vanadium type such as the so-called "Selden" catalysts which are generally silicates containing two or more bases more particularly described in the U. S. Jaeger Letters Patent Nos. 1,675,308 and 1,675,309 of June 28, 1928, and No. 1,694,123 of December 4, 1928 arranged preferably in a converter or series of converters of the self-cleaning type such as are described in my pending application for patent Serial No. 390,510 filed September 5, 1929, I can obtain 97–98% conversion from the burner gases derived from raw materials having an arsenic content of at least five times that of brimstone of the Louisiana type and also when such gases contain chlorine, fluorine and other impurities.

I have further discovered that with vanadium catalysts of the type described, a satisfactory conversion can be made without blocking or poisoning the catalysts provided the burner gases containing $SO_2$ are maintained at proper temperatures throughout the successive steps of the process with removal of dust and fume, so that my improved process may be advantageously employed in the wide field where impure raw materials are used to produce the burner gas containing sulphur dioxide. I am unable to state definitely why this relatively large arsenic content (when compared with brimstone of the Louisiana type), together with chlorine, fluorine and other impurities ordinarily found in the raw materials, fails to injure or poison these vanadium catalysts, but it may be due to the fact that the impurities volatilized from the raw material or carried over in the form of dust, such as selenium, arsenic, chlorine and fluorine are in contact with dust particles of iron oxides and silica at a high temperature, and that reactions take place between these impurities when maintained at a high temperature. This may result in their more ready removal from the gas stream by the purification process herein described. For example, it is well known that arsenic reacts with iron oxide to form a non-volatile product which can be readily removed with the dust from the gas stream. Likewise, fluorine and hydrofluoric acid reacts with silica to form products much more readily removable as such than the fluorine or hydrofluoric acid itself. Moreover, if the hydrofluoric acid is permitted to enter the catalyst chamber, it will in time cause detrimental deterioration of the silicious catalyst carrier. Such removal under these conditions prevents coating or poisoning of the vanadium catalyst and likewise deterioration of the catalyst carrier.

Undoubtedly the mechanical effect of the dust and fume is largely overcome when using a self-cleaning converter such as is described in my said pending application Serial No. 390,510 in which the heat generated may be removed in the manner described.

In setting forth my invention, I will make reference to the accompanying flow-sheet drawing diagrammatically illustrating a contact sulphuric acid plant in which my improved process may be advantageously practiced.

In this drawing, the burner A may be of a type suitable to the burning of sulphur containing ores, or of a type for burning brimstone under the conditions which I will describe. In this burner A, a gas is formed which will be about a 7% $SO_2$ gas having a temperature of about 900° F., and the temperature of such gas leaving the burner will be indicated as 900° F. The air required to support combustion in the burner A and to form part of the gas therein is drawn into the burner A by any suitable type of blower or fan F.

The air entering the burner A may be partially or completely dried before it enters the burner if desired. The hot gases from the burner A are then passed through a dust collecting apparatus B. This dust collector B may be of any type suitable for precipitating most of the dust in the gas. The gas leaving the dust apparatus B will have a temperature of about 600° F. under normal operating conditions, though by insulating the flues from the burner A to the dust apparatus B, and where necessary the dust apparatus, the heat in the burner gas may be so conserved that the gases leaving the dust chamber B are around 750° F.

The gases leaving the dust apparatus B are conducted to a converter or series of converters C. This converter C may be of the self-cleaning type described in my said pending application Serial No. 390,510. The catalyst preferably used in the converter is of the "Selden" vanadium type which I have hereinbefore mentioned.

The hot gases from the dust chamber B at approximately 750° F. so that hazardous condensation of sulphuric acid is minimized, enter the converters or contact chambers C in which the mixed $SO_2$ and air passing over, or through, the vanadium contact material is converted to $SO_3$ to the extent of 97–98%. The heat generated in the reaction may be removed in any manner, preferably as shown in my copending application Serial No. 390,510. The temperature of the gases at this point, i. e., where they leave the converter system, is about 800° F.

These gases may be cooled by passing same through a cooler, but will generally be cooled sufficiently by the time they pass through the flue to the acid condenser D, so that no separate piece of apparatus for cooling is required.

The gases from the converter C enter the condenser D at a temperature around 600° F. or above the condensation point of sulphuric acid. The condenser D may comprise the usual type of absorber over which 99% sulphuric acid is circulated, or a preferred method of operation is to circulate acid of around 93% strength over this absorber. Under the latter procedure the greater part of the $SO_3$ will be hydrated and condensed and the balance will pass along as a mist to the mist remover E. Water may be added to further humidify the gases after the condenser D. The mist remover E in cooperation with the condenser D are operated as described in my Patent No. 1,896,287 of February 7, 1933, so that the $SO_3$ gas will contact with sulphuric acid having a higher aqueous vapor pressure than 98% acid to partly absorb the $SO_3$ and also humidify the balance of the $SO_3$ to be thereafter condensed in the mist remover E and recovered. Leaving the mist remover E the gases pass to the blower or fan F and are then discharged to the air.

During the entire passage of the gases from the burner A to the condenser D, their temperature is conserved and maintained at a point where a considerable portion of the impurities will react to form non-volatile products which are subsequently removed either in the dust apparatus B or in a subsequent filter. The presence of either a dust precipitator or remover and/or a filter permits a prolonged contact between the reacting impurities and gives them ample time to be converted into a physical and chemical form where their removal may be more readily accomplished. In short, the gases are never at any point permitted to become cool so that any substantial reheating is needed to bring them into proper condition for the further treatments. All heat changes required in this process are of reducing temperatures, and not of raising temperatures. The gases are therefore maintained from the burner A through to the last converter C at temperatures approximating the temperatures involved in the original creation of the $SO_2$ gas mixture. By my improved process the usual elaborate purifying equipment heretofore required when burning sulphide ores or impure brimstone for producing the $SO_2$ burner gas is avoided.

Where desired, iron oxides and/or silica may be deliberately added to such $SO_2$ gases containing arsenic and fluorine and the mixture maintained at an impurity reaction temperature to form such readily removable products where such gases do not already contain the necessary reacting ingredients.

I claim:

1. In the process of making contact sulphuric acid, the steps which comprise burning sulphur containing material to produce a sulphur dioxide gas mixture containing fluorine, introducing sufficient silica into the gas to provide a content thereof sufficient to react with all the fluorine maintaining such mixture above 600° F. to permit the fluorine and silica to react, subsequently removing dust and fume without material reduction of gas temperature, and passing the so purified gas into reacting contact with a catalyst of the vanadium type.

2. A process of making sulphuric acid by the contact process which comprises burning sulphide ores containing relatively large amounts of impurities including halogens and arsenic under conditions such that a hot sulphur dioxide gas mixture is obtained containing gaseous halogen and arsenic compounds and iron oxide, maintaining the hot gas mixture so obtained at temperatures above 600° F. for a sufficient length of time to permit the gaseous impurities to react with suspended solid material including the iron oxide, subsequently removing dust, fume and non-volatile constituents without material reduction of gas temperature, and passing the resulting gases through a catalyst of the vanadium type at reaction temperatures.

3. A process of making sulphuric acid by the contact process which comprises burning sulphide ores containing relatively large amounts of impurities including halogen and arsenic under conditions such that a hot sulphur dioxide mixture is obtained containing gaseous halogen and arsenic compounds, iron oxide and silica, maintaining the hot gas mixture so obtained at temperatures above 600° F. for a sufficient length of time to permit the gaseous impurities to react with suspended solid material including the iron oxide and silica, subsequently removing dust, fume and non-volatile constituents without material reduction of gas temperature, and passing the resulting gases through a catalyst of the vanadium type at reaction temperatures.

4. A process of making sulphuric acid by the contact process which comprises burning Spanish pyrites under conditions such that a hot sulphur dioxide gas mixture is obtained containing gaseous halogen and arsenic compounds, iron oxide and silica, maintaining the hot gas mixtures so obtained at temperatures above 600° F. for a sufficient length of time to permit the gaseous impurities to react with suspended solid material including the iron oxide and silica, subsequently removing dust, fume and non-volatile constituents without material reduction of gas temperature, and passing the resulting gases through a catalyst of the vanadium type at reaction temperatures.

CYRIL B. CLARK.